United States Patent
Bargheer et al.

(10) Patent No.: US 6,761,399 B2
(45) Date of Patent: Jul. 13, 2004

(54) MOTOR VEHICLE SEAT

(75) Inventors: Claudio Bargheer, Holzgerlingen (DE); Karl Pfahler, Stuttgart (DE); Lothar Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/317,825

(22) Filed: Dec. 12, 2002

(65) Prior Publication Data

US 2003/0132650 A1 Jul. 17, 2003

(30) Foreign Application Priority Data

Dec. 21, 2001 (DE) .......................................... 101 63 049

(51) Int. Cl.⁷ ................................................. A47C 7/72
(52) U.S. Cl. ........................... 297/180.12; 297/180.14; 297/452.42; 297/452.46; 454/120
(58) Field of Search ...................... 297/180.12, 180.14, 297/452.42, 452.46, 452.47, 180.13; 454/120

(56) References Cited

U.S. PATENT DOCUMENTS

| | | | | |
|---|---|---|---|---|
| 3,101,660 A | * | 8/1963 | Taylor .......................... | 454/120 |
| 5,102,189 A | * | 4/1992 | Saito et al. ............. | 297/180.14 |
| 5,839,774 A | * | 11/1998 | Hack et al. .................... | 296/91 |
| 6,321,996 B1 | * | 11/2001 | Odebrecht et al. ...... | 237/12.3 A |
| 6,604,785 B2 | * | 8/2003 | Bargheer et al. ........ | 297/180.14 |

FOREIGN PATENT DOCUMENTS

| | | | |
|---|---|---|---|
| DE | 199 49 935 | | 11/2000 |
| DE | 100 47 754 | | 4/2002 |
| EP | 0217752 | * | 4/1987 |

* cited by examiner

Primary Examiner—Laurie K. Cranmer
(74) Attorney, Agent, or Firm—Kenyon & Kenyon

(57) ABSTRACT

In a motor vehicle seat for an open motor vehicle, with an air supply device integrated in its backrest and/or head restraint, the device including an air outlet duct having an outlet opening arranged on the front side of the head restraint, for supplying the head, neck and shoulder region of the vehicle occupant with hot air, and an air inlet duct having an inlet opening, with a heating element being assigned to the air supply device. The inlet opening of the air supply device is arranged on the rear side of the backrest or of the head restraint and approximately level with or above a rear end wall edge of the motor vehicle.

18 Claims, 2 Drawing Sheets

MOTOR VEHICLE SEAT

CROSS-REFERENCE TO RELATED APPLICATIONS

The present application claims priority to Application No. 101 63 049.2, filed in the Federal Republic of Germany on Dec. 21, 2001, which is expressly incorporated herein in its entirety by reference thereto.

FIELD OF THE INVENTION

The present invention relates to a motor vehicle seat.

BACKGROUND INFORMATION

German Published Patent Application No. 199 49 935 describes a motor vehicle seat for an open motor vehicle with an air supply device integrated in its head restraint, the device including an air outlet duct having an outlet opening arranged on the front side of the head restraint, for supplying the head, neck and shoulder region of the vehicle occupant with hot air, and an air inlet duct having an inlet opening, with a heating element being assigned to the air supply device. The air supply device is overall of very space-consuming and complex design.

It is an object of the present invention to provide a motor vehicle seat, the air supply device of which requires a smaller structural space and is of simpler construction.

SUMMARY

The above and other beneficial objects of the present invention are achieved by providing a motor vehicle seat as described herein.

In the case of the motor vehicle according to the present invention, the inlet opening is arranged on the rear side of the backrest or of the head restraint, as a result of which an air flow flowing back into the passenger cell during open travel may enter into the air supply device and may be used as a hot air flow for supplying the head, neck and shoulder region of the vehicle occupant. In addition, a short air path between the inlet opening and the outlet opening may be achieved, and the air supply device may be configured more compactly and with greater efficiency. Also, the short air path means that the heating element may be of smaller and more energy-efficient configuration. The inlet opening is arranged level with or above a rear end wall edge of the motor vehicle, so that the backflowing air flow may pass with corresponding intensity into the air supply device.

Further aspects, features and details of the present invention are described below with reference to exemplary embodiments and with reference to the drawings.

DETAILED DESCRIPTION

Figure 1:
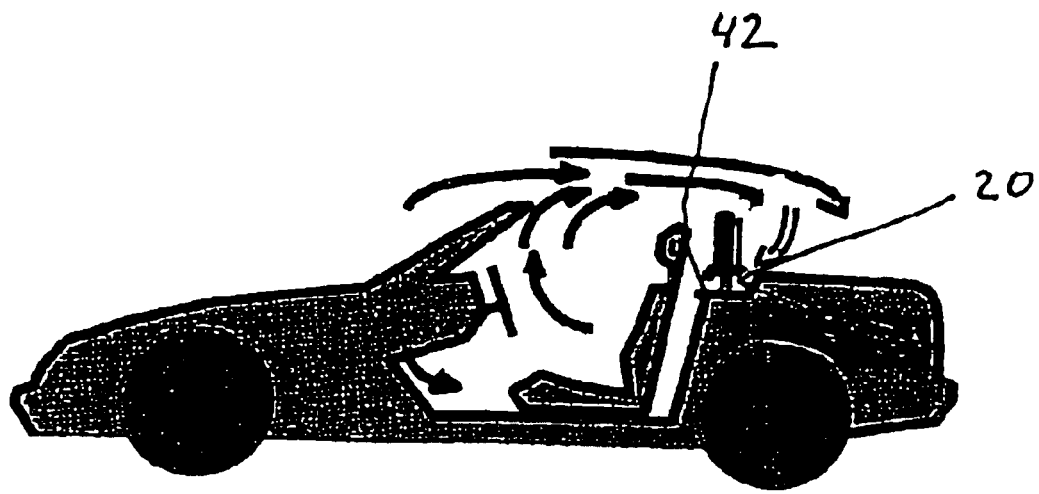
FIG. 1 is a schematic side view of an open motor vehicle having a motor vehicle seat according to the present invention.
Figure 2:
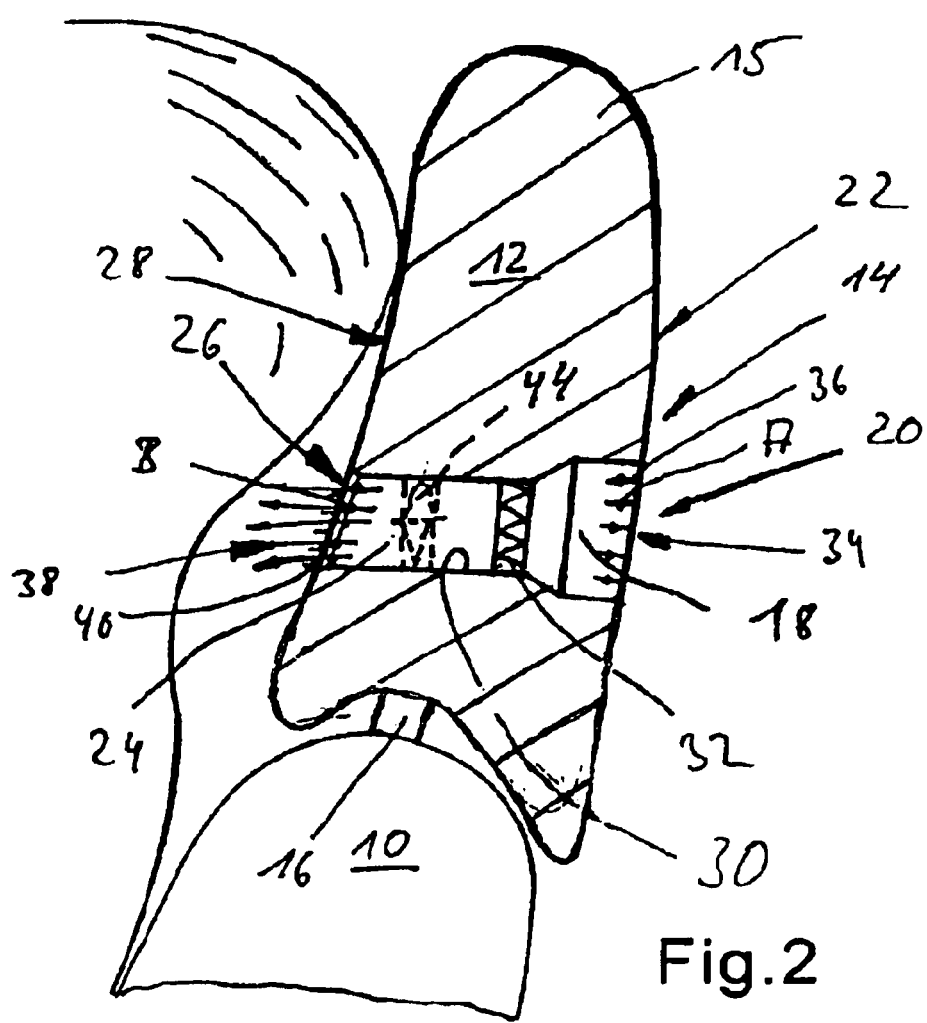
FIG. 2 is a schematic cross-sectional view in the longitudinal direction of the vehicle of the upper region of a motor vehicle seat according to the present invention having an integrated air supply device for supplying the head, neck and shoulder region of the seat occupant with hot air.
Figure 3:
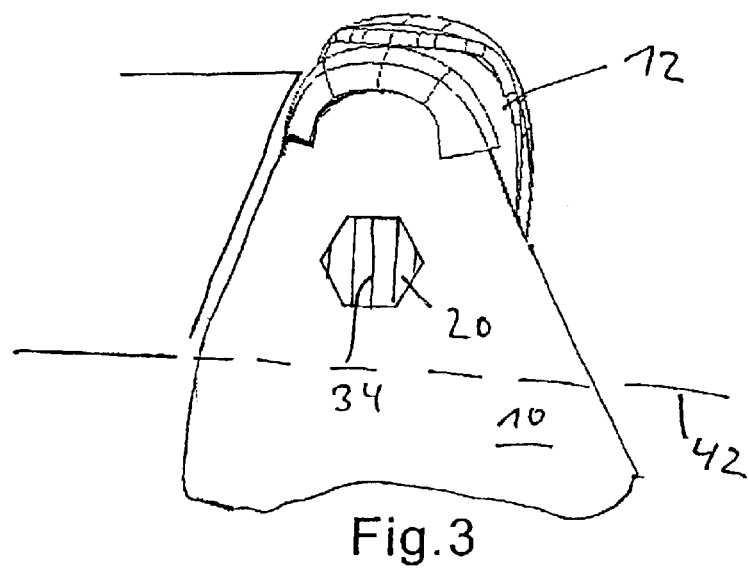
FIG. 3 is a schematic, perspective rear view of the upper region of the backrest together with the head restraint of a motor vehicle seat according to the present invention, the head restraint arranged height-displaceably in front of the backrest, according to a second example embodiment.
Figure 4:
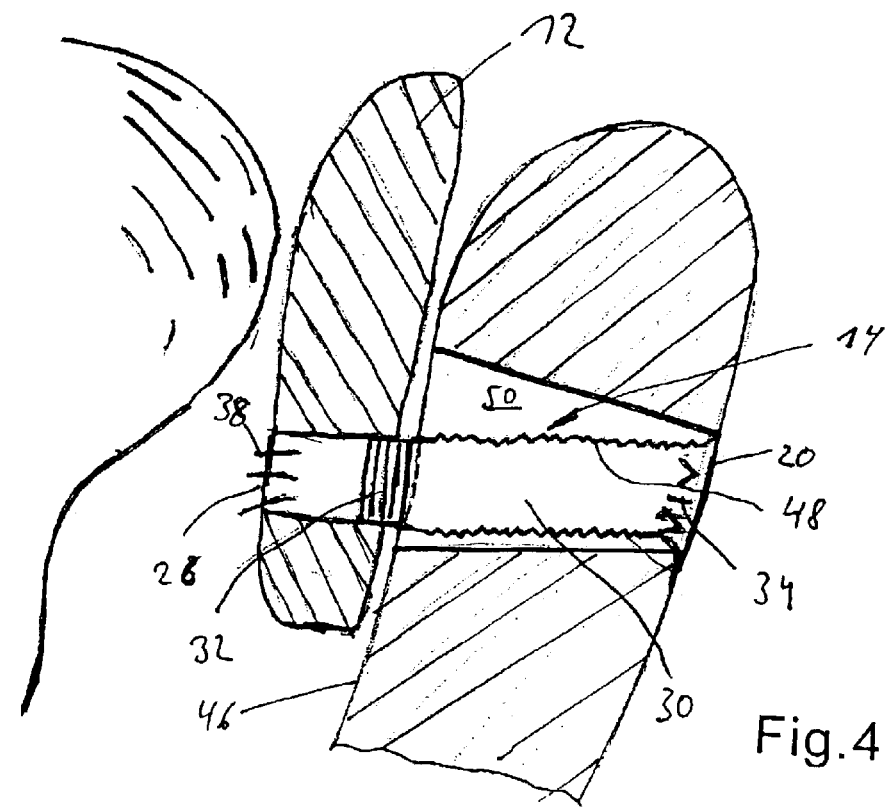
FIG. 4 is a schematic cross-sectional view in the longitudinal direction of the vehicle of the upper region of the motor vehicle seat illustrated in FIG. 3.

FIG. 1 is a schematic side view of an open motor vehicle having two motor vehicle seats which are arranged next to each other with a respective air supply device 14, which may be seen in FIGS. 2 to 4, integrated in the backrest 10 and/or head restraint 12, for supplying the head, neck and shoulder region of the seat occupant with hot air. FIG. 2 is a schematic, vertical cross-sectional view in the longitudinal direction of the vehicle through the head restraint 12 which is supported on the backrest 10 via vertical rods 16 and in which the air supply device 14 is integrated. The air supply device 14 is surrounded, e.g., by padding material 15, such as foam material, etc., illustrated by hatching. The air supply device 14 includes an air inlet duct 18 having an inlet opening 20 on the rear side 22 of the head restraint 12 and an air outlet duct 24 having an outlet opening 26 on the front side 28 of the head restraint 12. The air outlet duct and air inlet duct 18, 24 are arranged as a tubular duct 30 which stretches from the front side 28 to the rear side 22 of the head restraint 12 and extends in a lower region of the head restraint 12 in the longitudinal direction of the vehicle. The air inlet duct 18 is of cross-sectionally larger configuration than the air outlet duct 24. Arranged within the tubular duct 30, approximately in the center of the head restraint 12, is a heating element 32 through which the air flow entering at outside temperature into the air inlet duct 18 may be heated, e.g., to a temperature of between 30° and 50° C.

A metering device 34 having a plurality of air-guiding vanes 36, which are mounted in a manner such that they pivot in each case about an axis A extending in the transverse direction of the vehicle, is provided in the region of the inlet opening 20 of the air inlet duct 18. This may enable the quantity of air passing through to be metered and the air flow to be introduced evenly into the air inlet duct 18, so that a large quantity of air may be detected and converted over a relatively small distance into a laminar flow. By closing the metering device 34, the air supply device 14 may be deactivated. The closing of the metering device 34 is connected to the switching-off of the heating element 32. The air-guiding vanes 36 may also be fastened rigidly to the head restraint 12. An air-guiding device 38 including a plurality of further air-guiding vanes 40 mounted such that they may pivot in each case about an axis B extending in the transverse direction of the vehicle is provided in the region of the outlet opening 26 of the air outlet duct 24. By this arrangement, the heated air flow exiting via the outlet opening 26 may be conducted to the location desired by the seat occupant. The air-guiding vanes 40 have the effect that an air column having approximately the same temperature builds up. In addition, the guiding device 38 provides protection against any hair or items of clothing of the seat occupant being able to come into contact with the heating element 32. Instead of the air-guiding vanes 40, the arrangement of a net, a grid, etc., may also be possible.

The air supply device 14 functions as follows:

As is apparent from FIG. 1, the head wind flows over the upper region of the vehicle and the windscreen frame during driving, as a result of which, firstly, a negative pressure is produced in the passenger cell and, secondly, an air roll is formed at the rear end of the passenger cell and behind the head restraint 12. These eddying tails flow—as indicated schematically—back in the direction of the passenger cell and normally cause the seat occupant to feel a draft. The inlet opening 20 of the air supply device 14 on the rear side 22 of the head restraint 12 is arranged approximately level with or above a rear end wall edge 42 of the motor vehicle, so that the air flow flowing back from the rear may flow into the air supply device 14. The air flow is adjusted and evened out by the metering device 34, is then heated up by the heating element 32 and conducted out again through the air-guiding device 38. By this arrangement, the feeling of a draft by the seat occupant may be effectively suppressed. The intensity of the air flow flowing back from the rear depends on the driving speed of the vehicle. A strong air flow arises during rapid driving, and a weak air flow arises during slow driving. In particular for slow driving, a fan 44 (indicated by dashed lines in FIG. 2) may therefore additionally be provided within the tubular duct 30, which fan may be switched on, for example, as a function of the driving speed of the motor vehicle or of other parameters, such as the outside temperature, etc.

In FIGS. 3 and 4, in a schematic, perspective rear view and in a schematic cross-sectional view, respectively, the motor vehicle seat is illustrated in a second example embodiment, in which the head restraint 12 is arranged height-adjustably on the front side 46 of the backrest 10. The tubular duct 30 includes a flexible tubular section 48 which may be changed in length, e.g., in the manner of an expansion bellows. The passage opening 50 within the padding 15 is of frustoconical design, so that the tubular duct 30 may follow the set height of the head restraint 12. The heating element 32 is arranged approximately level with the transition from the backrest 10 to the head restraint 12. In the case of this example embodiment, too, a fan may additionally be arranged within the tubular duct 30. The end wall edge 42 and a windbreak 50 in the form of a net, etc. may be seen in FIG. 3, the inlet openings 20 of the air supply devices 14 being arranged on the rear side 22 of the backrest 10 or of the head restraint outside the region of overlap of the windbreak 50.

What is claimed is:

1. A motor vehicle seat for an open motor vehicle, comprising:
    an air supply device integrated in at least one of a backrest and a heat head restraint and including:
        an air outlet duct including an outlet opening arranged on a front side of at least one of the backrest and the head restraint and configured to supply a head, neck and shoulder region of a seat occupant with hot air;
        a heating element;
        an air inlet duct including an air inlet opening arranged on a rear side of at least one of the backrest and the head restraint and arranged at a height level of or above a rear end wall edge of the motor vehicle; and
        a metering device configured to adjust an air flow passing through the air supply device and arranged in a region of the air inlet duct, the metering device including a plurality of air-guidance vanes arranged in a region of the inlet opening.

2. The motor vehicle seat according to claim 1, wherein the air outlet duct and the air inlet duct include a tubular duct extending from the front side to the rear side.

3. The motor vehicle seat according to claim 2, wherein the tubular duct is arranged to extend in a longitudinal direction of the motor vehicle in a lower region of the head restraint.

4. The motor vehicle seat according to claim 1, further comprising an air-guidance device including a plurality of adjustable air-guidance vanes arranged in a region of the outlet opening of the air outlet duct.

5. The motor vehicle seat according to claim 1, wherein the air supply device includes a switchable fan.

6. The motor vehicle seat according to claim 5, wherein the fan is configured to be switched on as a function of a driving speed of the motor vehicle.

7. A motor vehicle seat for an open motor vehicle, comprising:
    an air supply device integrated in at least one of a backrest and a head restraint and including:
        an air outlet duct including an outlet opening arranged on a front side of at least one of the backrest and the head restraint and configured to supply a head, neck and shoulder region of a seat occupant with hot air;
        a heating element; and
        an air inlet duct including an air inlet opening arranged on a rear side of at least one of the backrest and the head restraint and arranged at a height level of or above a rear end wall edge of the motor vehicle;
    wherein the air outlet duct and the air inlet duct include a tubular duct extending from the front side to the rear side; and
    wherein the head restraint is arranged height adjustably on the front side of the backrest and the tubular duct is flexible.

8. The motor vehicle seat according to claim 7, wherein the tubular duct includes a tubular section changeable in length.

9. The motor vehicle seat according to claim 7, wherein the tubular duct includes a tubular section changeable in length in the form of an expansion bellows.

10. An open motor vehicle, comprising:
    a motor vehicle seat including an air supply device integrated in at least one of a backrest and a head restraint, the air supply device including:
        an air outlet duct including an outlet opening arranged on a front side of at least one of the backrest and the head restraint and configured to supply a head, neck and shoulder region of a seat occupant with hot air;
        a heating element;
        an air inlet duct including an air inlet opening arranged on a rear side of at least one of the backrest and the head restraint and arranged at a height level of or above a rear end wall edge of the motor vehicle; and
        a metering device configured to adjust an air flow passing through the air supply device and arranged in a region of the air inlet duct, the metering device includes a plurality of air-guidance vanes arranged in a region of the inlet opening.

11. The motor vehicle according to claim 10, wherein the air outlet duct and the air inlet duct include a tubular duct extending from the front side to the rear side.

12. The motor vehicle according to claim 11, wherein the tubular duct is arranged to extend in a longitudinal direction of the motor vehicle in a lower region of the head restraint.

13. The motor vehicle according to claim 10, wherein the motor vehicle seat further includes an air-guidance device including a plurality of adjustable air-guidance vanes arranged in a region of the outlet opening of the air outlet duct.

14. The motor vehicle according to claim 10, wherein the air supply device includes a switchable fan.

15. The motor vehicle according to claim 14, wherein the fan is configured to be switched on as a function of a driving speed of the motor vehicle.

16. An open motor vehicle, comprising:
a motor vehicle seat including an air supply device integrated in at least one of a backrest and a head restraint, the air supply device including:
an air outlet duct including an outlet opening arranged on a front side of at least one of the backrest and the head restraint and configured to supply a head, neck and shoulder region of a seat occupant with hot air;
a heating element; and
an air inlet duct including an air inlet opening arranged on a rear side of at least one of the backrest and the head restraint and arranged at a height level of or above a rear end wall edge of the motor vehicle;
wherein the air outlet duct and the air inlet duct include a tubular duct extending from the front side to the rear side; and
wherein the head restraint is arranged height adjustably on the front side of the backrest and the tubular duct is flexible.

17. The motor vehicle according to claim 16, wherein the tubular duct includes a tubular section changeable in length.

18. The motor vehicle according to claim 16, wherein the tubular duct includes a tubular section changeable in length in the form of an expansion bellows.

* * * * *